(No Model.)

W. C. BLUNDELL.
CHURN.

No. 581,687. Patented May 4, 1897.

Witnesses:
F. G. Fischer
G. Y. Thorpe

Inventor
Wm C. Blundell
By Higdon & Higdon
Attys.

UNITED STATES PATENT OFFICE.

WILLIAM C. BLUNDELL, OF KANSAS CITY, MISSOURI.

CHURN.

SPECIFICATION forming part of Letters Patent No. 581,687, dated May 4, 1897.

Application filed July 9, 1896. Serial No. 598,615. (No model.)

*To all whom it may concern:*

Be it known that I, WILLIAM C. BLUNDELL, of Kansas City, Jackson county, Missouri, have invented certain new and useful Improvements in Churns, of which the following is a full, clear, and exact description, reference being had to the accompanying drawings, forming a part thereof.

My invention relates to churns, and my object is to produce a churn which shall be positive and effective in the manufacture of butter and which may be manipulated with a minimum expenditure of power or exertion on the part of the operator, or which may be operated by any other suitable power desired.

A further object of the invention is to produce a churn which is exceedingly simple, strong, durable, and inexpensive of manufacture.

To these ends the invention consists in certain novel and peculiar features of construction and combination of parts, as will hereinafter be described and claimed.

In order that the invention may be fully understood, I will proceed to describe it with reference to the said accompanying drawings, in which—

Figure 2:
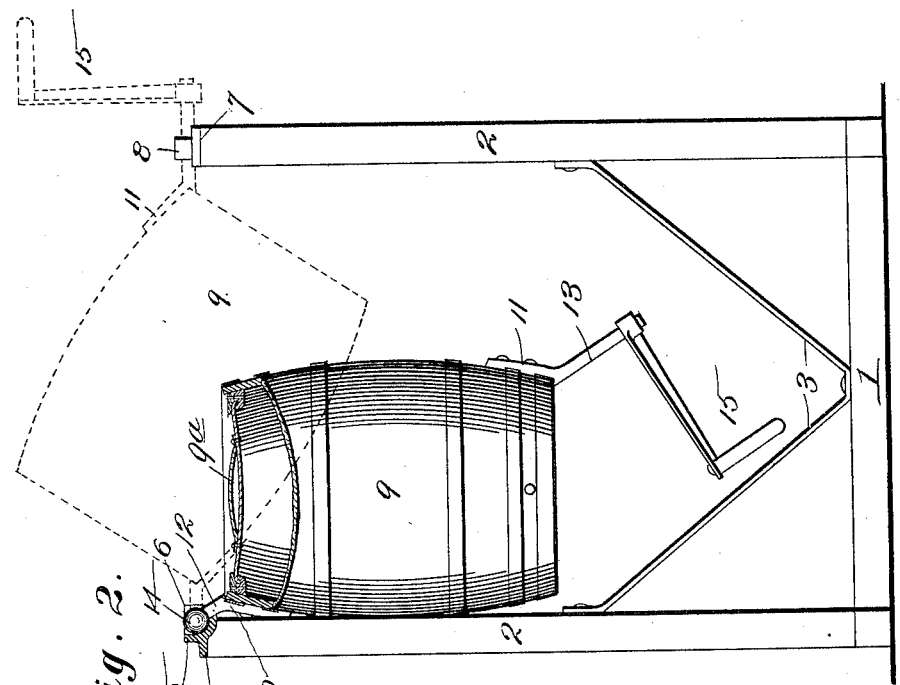
Figure 1:
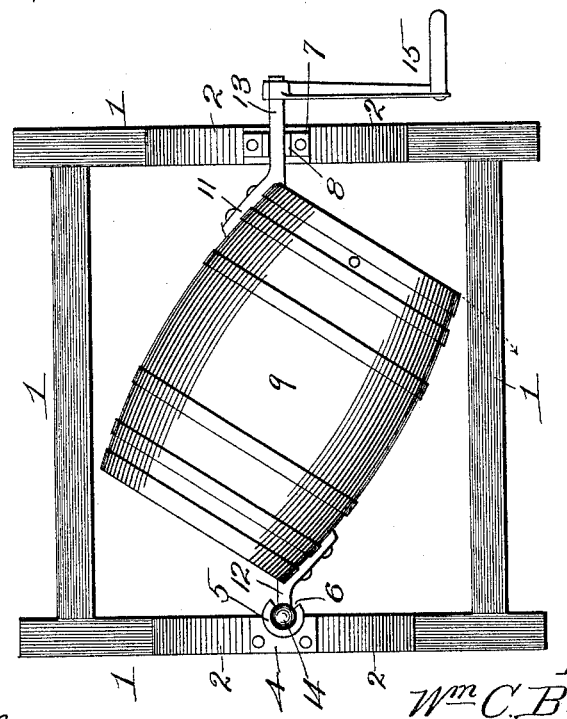

Figure 1 represents a plan view of the churn constructed in accordance with my invention. Fig. 2 represents a side elevation of the same, partly broken away, and illustrates the churn proper in dotted lines in operative position for manufacturing butter and in full lines in position for the reception or introduction of the cream or the extraction or inspection of the butter.

Referring to said drawings in detail, a framework consists of a rectangular base composed of the bars 1, which are bolted or otherwise suitably connected together, the vertically-opposing standards, which consist of upwardly-converging bars 2 2, connected at their upper ends by the metallic V-shaped brace 3, which is secured to the frame in any suitable manner. Secured upon the upper end of one of said standards is a plate 4, which is provided with a hemispherical socket 5, cut away at its inner side, as shown at 6, and secured upon the upper end of the other standard is a plate 7, provided with an upwardly-projecting U-shaped bearing 8, which is open at its upper side.

9 designates the churn proper, which comprises no more or less than an ordinary liquid-tight cask, provided at its upper end with a detachable head 9ª, which may be easily removed to obtain access to the interior of the churn, but which when closed is absolutely liquid-tight. At diametrically opposite sides and at opposite ends of the churn are secured plates 10 and 11. The plate 10 is secured at the upper end of the churn, while the plate 11 is secured at the lower end, and projecting from said plates diagonally of the churn and in longitudinal alinement are cylindrical bearing-arms 12 and 13, respectively. The arm 12, which is the shorter of the two, preferably extends loosely through the notch or open side 6 of the hemispherical or cup-shaped socket 5 and is provided at its front end with a spherical enlargement or ball 14, which fits rotatably in said socket, so as to constitute practically a ball-and-socket connection. The arm 13 extends loosely through the bearing 8 and is provided at its outer end with a crank-handle 15, by which it is operated.

When the churn occupies the position described and is supplied with the requisite quantity of cream, it is obvious that by its rapid rotation first one end and then the other is alternately raised and lowered, so as to thoroughly and effectively agitate the cream therein and consequently produce butter in a very short time. It is also obvious that this operation may be performed with a minimum expenditure of exertion on the part of the operator.

If at any time it is desirable to ascertain the condition of the contents of the churn or if it is necessary, using the ball-and-socket connection as a fulcrum, the arm 13 is lifted out of the bearing 8 and the churn is permitted to assume the position shown in full lines, Fig. 2. The cover is then removed, and after being replaced the churn is easily lifted back to its relative position. It is obvious by this construction that butter-making is facilitated generally, and that the contents of the churn may be easily removed by inverting the churn, if desired, and still using the ball-and-socket connection as a fulcrum, or it can be left in its relative position, the cover removed, and the contents easily extracted. It will be seen also that the churn or cask may be easily lifted bodily from the framework when it is necessary or desirable to clean it thoroughly or to remove it for any other reason.

From the above description it is obvious that I have produced a churn which embodies the advantages enumerated in the statement of invention, and it is also obvious that changes in the form, proportion, or detail construction of the parts or the substitution of mechanical equivalents may be resorted to without departing from the spirit and scope or sacrificing any of the advantages of my invention.

Having thus described my invention, what I claim as new, and desire to secure by Letters Patent, is—

1. The combination with a suitable framework, of a hemispherical socket provided with a notch at one side, a U-shaped bearing upon said framework opposite said notch, and a churn provided at diagonally opposite points with alined arms, one of them projecting through said notch and having a spherical end resting in said socket and in diameter exceeding the width of said notch, and the other resting in said U-shaped bearing and provided with a handle.

2. The combination with a framework comprising a suitable base and standards projecting upwardly therefrom, plates secured upon the upper ends of said standards, one of them provided with a hemispherical socket having an opening at its inner side, and the other with a U-shaped bearing which is open at its upper side, a churn, provided with two longitudinally-alined arms at its ends whose axes extend diagonally to the center of the churn, one of said arms extending through the opening of the said socket, and having at its outer end a spherical enlargement or ball which is loosely mounted in said socket, and the other extending rotatably through the U-shaped bearing, and means for rotating said arm and thereby said churn, substantially as described.

In testimony whereof I affix my signature in presence of two witnesses.

WILLIAM C. BLUNDELL.

Witnesses:
 H. E. PRICE,
 G. Y. THORPE.